United States Patent Office 3,198,268
Patented Aug. 3, 1965

3,198,268
METHOD OF REDUCING FLUID LOSS
IN WELL TREATMENT
Gordon P. Lindblom, Gerald D. Ortloff, and John T.
Patton, Tulsa, Okla., assignors, by mesne assignments, to
Esso Production Research Company, Houston, Tex., a
corporation of Delaware
No Drawing. Filed July 2, 1963, Ser. No. 292,480
14 Claims. (Cl. 175—72)

This application is a continuation-in-part of Serial No. 850,019, filed in the United States Patent Office on November 2, 1959.

The present invention relates to oilfield drilling muds and similar compositions and is particularly concerned with materials useful in the preparation of such compositions.

The drilling muds used in oil wells, gas wells and similar boreholes are generally aqueous solutions containing suspended solids designed to impart the required density, viscosity and thixotropic properties. When such a mud comes in contact with porous subsurface strata, the liquid constituents normally tend to filter into the strata. The solids accumulate to form a filter cake on the borehole wall. It is preferable that the quantity of liquid thus lost to the surrounding formation and the thickness of the filter cake formed be held to a minimum. The loss of large quantities of liquid and the formation of a thick cake adversely affects critical properties of the mud, contaminates fluids present in the formation, leads to the hydration of clays and shales, complicates the interpretation of logs, obscures oil and gas sands that might otherwise be detected, and promotes sticking of the drill string in the borehole. Similar problems are encountered with workover fluids, completion fluids, fracturing fluids and related compositions. Additives are often employed to minimize these and related difficulties encountered with muds and similar compositions.

A variety of organic gums and polymers have been used or proposed for use as additives in drilling muds and related fluids. These include starch, carboxymethyl cellulose, gum tragacanth, gum karaya, gum ghatti, guar gum, Irish moss, acrylonitrile polymers, phenol-formaldehyde condensation products, Viscoba gum, and the like. None of these materials has been found wholly satisfactory. Experience has shown that most gums and polymers must be used in relatively high concentrations in order to secure satisfactory fluid loss properties and other characteristics, that such materials often produce excessive viscosities when used in the required concentrations, that many of the materials are sensitive to the presence of salts and to changes in pH or temperature, and that in many cases they can be employed only under carefully controlled conditions. With the exception of starch and carboxymethyl cellulose, none of these materials has been used extensively in field operations.

The present invention provides an improved class of additives for use in drilling muds and related compositions which have advantages over materials used or proposed for use in the past. In accordance with the invention, it has now been found that fermentates derived by the action of bacteria of the genus Xanthomonas on carbohydrates are surprisingly effective additives. Tests have shown that such materials can be used as fluid loss control agents in concentrations lower than those generally required with materials available heretofore, that they do not produce excessively high viscosities when employed in the proper concentrations, and that they are not generally affected seriously by salts or changes in pH or temperature conditions. In addition, it has been found that the fermentates have little or no tendency to plate out on cuttings, that muds and other fluids prepared with them have high carrying capacities, that such fluids have excellent hole stabilizing characteristics, that the fermentates reduce friction losses in the drill string, and that they generally increase bit life. Because of these and other characteristics, the fermentates significantly improve the performance of drilling muds, completion fluids, workover fluids, fracturing fluids and similar compositions in which they are used.

The fermentates employed for purposes of the invention are produced by the fermentation of carbohydrate solutions with bacteria of the genus Xanthomonas. Specific Xanthomonas organisms which may be employed include Xanthomonas begoniae, Xanthomonas campestris, Xanthomonas carotae, Xanthomonas hederae, Xanthomonas incanae, Xanthomonas malvacearum, Xanthomonas papavericola, Xanthomonas phaseoli, Xanthomonas pisi, Xanthomonas translucens, Xanthomonas vasculorum and Xanthomonas vesicatoria. Cultures of these and other xanthomonads are contained in the American Type Culture Collection located in Washington, D.C., and in other repositories. Experimental work has shown that fermentates produced by members of the genus Xanthomonas have characteristic properties which permit their use for purposes of the invention but that certain species of the bacteria are more effective for fermentation purposes than are others. Xanthomonas begoniae, Xanthomonas campestris, Xanthomonas pisi, and Xanthomonas vesicatoria, are particularly outstanding in this respect and are therefore preferred.

A variety of carbohydrates may be utilized to produce fermentates suitable for purposes of the invention. Carbohydrates found effective include glucose, sucrose, fructose, maltose, lactose, galactose, soluble starch, cornstarch and the like. Such carbohydrates need not be in a highly refined state and hence many crude products having a relatively high carbohydrate content may be used in carrying out the fermentation reaction. Specific examples of suitable products include raw sugar, crude molasses, sugar beet juice, corn mash and the like. Unrefined carbohydrate sources such as these are generally available at significantly lower costs than are the refined materials and are therefore normally preferred as substrates. The fermentation medium employed is normally an aqueous solution containing from about 1% to about 5% by weight of the carbohydrate, from about 0.01% to about 0.5% by weight of dipotassium acid phosphate, and from about 0.1% to about 10% by weight of a nutrient including organic nitrogen sources and appropriate trace elements. One example of a suitable nutrient is "Stimuflav," manufactured from distillers' solubles by Hiram Walker & Sons. A mixture containing 2 weight percent raw sugar, 0.1 weight percent dipotassium acid phosphate, and 0.5 weight percent Stimuflav has been found particularly effective. It will be understood, of course, that other ingredients may be employed in the fermentation medium in somewhat different proportions in order to obtain most efficient fermentation. It has been found, for example, that crude sugar beet juice normally contains the required nitrogen sources and trace elements in sufficient quantities to permit satisfactory fermentation and that the use of additional nutrients in media prepared from this material is therefore unnecessary in most cases.

In carrying out the fermentation reaction, the aqueous fermentation medium prepared as described above is first sterilized by heating it to an elevated temperature or passing live steam through it. After it has cooled, the sterilized solution is then inoculated with live bacteria of the genus Xanthomonas. Sterilized air is bubbled into the medium to provide the required aerobic conditions.

The medium is permitted to ferment at a temperature between about 65° F. and about 100° F., preferably between about 75° F. and 85° F., for a period of from one to three days. Agitation is provided, either by means of a suitable stirrer or by means of the air injected. As fermentation progresses, the viscosity of the medium increases due to conversion of the carbohydrate into a heteropolysaccharide. The reaction may be halted after the viscosity of the fermentate, when diluted with 6 parts of distilled water, reaches a value of about 70 centipoises as measured with a Brookfield viscometer. In a properly controlled fermentation process, this point is normally reached after about 48 hours. To secure maximum conversion of carbohydrate to the heteropolysaccharide, the pH of the medium should be controlled. Sodium hydroxide or a similar alkaline reagent can be added to the solution at intervals and in amounts sufficient to overcome the acidity caused by production of the heteropolysaccharide and maintain the pH at a level above about 6, preferably between about 6.5 and about 7.5. In some cases a buffer may be used to assist in pH control. On completion of the fermentation reaction, the fermentate can be sterilized by heating it, passing steam through it, or adding a bactericide. The fermentate is recovered as a thick viscous solution which has a dull yellow color and contains heteropolysaccharide, bacterial cells and unconverted carbohydrate from the medium.

The fermentate produced as described above may be added directly to a drilling mud or similar composition or may instead be dried first in order to facilitate handling and shipping. The latter procedure is normally preferred. Tests have shown that in either case the fermentate is surprisingly more effective as a fluid loss control agent, when used in the same concentration on a dry weight basis, than the relatively pure heteropolysaccharide recovered from the fermentate. The reasons for this are not fully understood. If a drying step is employed, the whole fermentate will normally be fed directly to the drying apparatus. It is generally preferred to dry the material at temperatures between about 125° F. and about 300° F., although temperatures outside this range may be used, particularly if a vacuum is employed. The drying operation may be carried out with a spray dryer, a tunnel dryer, a rotary dryer or similar equipment. The dried product is normally recovered as a soft finely-divided powder having a yellowish color similar to that of the viscous fermentate.

The additives prepared as described above may be utilized in drilling fluids, completion fluids, workover fluids, fracturing fluids and other aqueous media from which fluid losses to subterranean strata must be controlled. The dried product is employed by first forming a stable dispersion of the material in the medium and thereafter permitting the heteropolysaccharide particles contained therein to hydrate. In some cases, particularly where the fermentate is dried on rolls or similar equipment instead of being spray dried, it may be desirable to further comminute the dried material before dispersing it. Conventional blending equipment can be used to prepare the necessary dispersion. A mud mixing hopper of the type normally employed for preparing colloidal dispersions of clay in drilling fluid will generally be satisfactory. The dispersed particles suspended in the aqueous media may not readily hydrate at acid pH values. In alkaline solutions, however, the particles rapidly hydrate and become voluminous. It is therefore generally preferred to add sufficient sodium hydroxide, potassium hydroxide or similar alkaline reagent to raise the pH of the solution to a value above about 7.5, preferably between about 8.0 and about 11.5. The quantity of alkaline material required will depend upon the pH of the medium employed. In some instances where the solution is initially alkaline, the addition of sodium hydroxide or the like will be unnecessary. The undried material may be simply added to the mud or other composition with sufficient agitation to produce uniform mixing.

The fermentate may be employed as a fluid loss control agent in drilling fluids and similar compositions in concentrations between about 0.05% and about 3.0%, based on the dry weight of the fermentate and the weight of liquid constituents in the fluid. The concentration employed will depend in part upon the severity of the fluid loss control problem which must be overcome, in part upon the viscosity of the composition in which the fermentate is to be used, and in part upon the other constituents of the mud or other composition. Addition of the dried fermentate produces some increase in the viscosity of compositions to which it is added and hence in some cases it may be preferred to control the concentration because of viscosity considerations. Most drilling muds and similar compositions contain suspended inorganic solids which alleviate fluid loss problems to some extent and thus a lower fermentate concentration than would otherwise be required may be satisfactory. The use of the fermentate in concentrations between about 0.05 weight percent and about 1.0 weight percent, again based on the dry weight of the fermentate and the weight of liquid constituents in the medium to which it is added, has been found to permit adequate fluid loss control under most circumstances and is therefore preferred.

The additives of the invention are subject to bacterial attack and over extended periods of time may be degraded. It is therefore advantageous to utilize the materials in connection with a small amount of formaldehyde, paraformaldehyde, an organo-metallic complex, a chlorinated phenolic compound, or a similar bactericidal or bacteriostatic preservative. The use of such a preservative extends the effectiveness of the fermentates and permits their storage over long periods of time. The preservative concentration employed will obviously depend upon the particular agents selected. In general, concentrations between about 0.001% and about 1.0%, based on the weight of the fluids in the system, are effective. In certain short term operations requiring a fluid loss control agent, the use of a preservative may be unnecessary.

As pointed out earlier, the additive agent of the invention may be employed in a variety of aqueous media used in contact with subsurface strata. Although in some applications, where it is desired to kill a well temporarily for example, the fermentates may be used in water or brine without other additives being present, in most instances other materials will be utilized in the media in which the fermentates are employed. Materials which may be present in muds and similar compositions include weighting agents such as barium sulfate, amorphous silica and calcium carbonate; gel forming materials such as bentonite and Attapulgus clay; viscosity modifying agents such as sodium metasulfate, quebracho, and calcium lignosulfonate; calcium treating agents such as lime, calcium sulfate and calcium chloride; emulsifiers such as petroleum sulfonate, tall oil soap and sodium lignosulfonate; and mixing oils such as crude oils and diesel oils. It will be understood that not all of these constituents will normally be present in any one drilling mud or other composition and that the amount of any particular material will be governed in part by the other constituents utilized and the service for which the composition is intended.

The effectiveness of the fermentates in drilling muds and similar compositions is demonstrated by the following examples.

EXAMPLE I

In the first of a series of experiments, a fermentation medium containing 2.0 weight percent raw sugar, 0.1 weight percent dipotassium acid phosphate and 0.05 weight percent of "Stimuflav," a commercial bacterial nutrient, was prepared. This medium was inoculated with *Xanthomonas campestris* organisms and fermented under aerobic conditions at a temperature of about 750

F. for a period of about 72 hours. A thick viscous fermentate containing bacterial cells, unconverted constituents from the fermentation medium and a heteropolysaccharide produced by the action of the bacteria on the sugar was recovered at the end of the period. This fermentate was dried in an oven at a temperature of 150° F. and then ground with a mortar and pestle to produce a finely-divided powder. A portion of the powder thus prepared was added to a brine in a concentration of 0.30% by weight by blending it in with a Waring blender for a period of 60 seconds. The brine employed contained 895 p.p.m. of sodium chloride, 67 p.p.m. of sodium bicarbonate, 89 p.p.m. of calcium chloride, 10 p.p.m. of calcium carbonate, and 135 p.p.m. of magnesium chloride. The pH of the resulting colloidal solution was adjusted from an initial value of about 7 to about 10.0 by the addition of sodium hydroxide. The viscosity of the solution increased due to hydration following the change in pH.

The brine solution containing the previously dried fermentate was tested in a standard fluid loss filter containing a porous ceramic disc 1 inch in diameter and ⅛ inch thick to determine the fluid loss properties. The rate at which water flowed through the disc under standardized conditions was first measured. It was found that, under a pressure gradient of 6 lbs. per square inch, about 90 milliliters of water passed through the disc in a 0.1 minute interval. Since the water contained essentially no suspended solids, this flow rate persisted in subsequent tests using water alone. The brine containing the fermentate was then tested in this filter using the same ceramic disc. The results obtained are shown in Table I below.

*Table I.—Filter loss control properties of brine containing fermentate*

| Filter Time, Minutes | Filter Pressure Differential, p.s.i. | Filtrate Recovered, ml. | Cumulative Filtrate Recovery, ml. |
|---|---|---|---|
| 0 | 6 | 0 | 0 |
| ½ | 6 | 4.40 | 4.40 |
| 1 | 6 | 0.30 | 4.70 |
| 2 | 6 | 0.16 | 4.86 |
| 3 | 6 | 0.12 | 4.98 |
| 4 | 6 | 0.04 | 5.02 |
| 5 | 6 | 0.08 | 5.10 |
| 10 | 6 | 0.25 | 5.35 |
| 15 | 6 | 0.19 | 5.54 |
| 20 | 6 | 0.16 | 5.70 |
| 25 | 6 | 0.17 | 5.87 |
| 30 | 6 | 0.14 | 6.01 |

It can be seen from the above table that the solution containing the previously dried fermentate had a fluid loss value of only 6.01 milliliters in 30 minutes under the test conditions employed. The fermentate was used in a concentration of 0.30 weight percent. This is equivalent to a concentration of about 1 lb. per barrel and is therefore much lower than the concentration in which starch, the most widely used of the organic fluid loss additives, is normally employed. Despite this low concentration, the fluid losses through the ceramic disc were extremely low. Moreover, the results show that the fermentate was not seriously affected by the salts present in the solution and can therefore be utilized in muds and similar compositions prepared with either fresh water or brine.

EXAMPLE II

In order to further demonstrate the surprising effectiveness of the fermentates, a fermentation medium having a composition similar to that described in the previous example was inoculated with *Xanthomonas vesicatoria* organisms and fermented for a period of about 3 days at room temperature and under aerobic conditions. The resultant fermentate, a viscous yellow liquid similar in appearance to that obtained in the previous example, was then divided into two portions. One of these was dried in an oven at a temperature of 173° F. to obtain a powdered material suitable for use as a drilling fluid additive. The other portion of the fermentate was diluted with distilled water and methanol and filtered to remove the bacterial cells. Potassium chloride, additional methanol and water were then used to precipitate the heteropolysaccharide from solution and permit its recovery as described in U.S. Patent 3,000,790, issued to Jeanes et al. on September 19, 1961. The purified polymer thus produced was dried in an oven at the same temperature used in drying the fermentate sample in order to obtain a finely-divided powder.

The two dried products prepared as described above were added to separate volumes of distilled water in a concentration of 1 lb. per barrel. Sodium hydroxide was added to each sample to raise the pH to about 7.5. Both samples showed an increase in viscosity due to hydration. The two samples were then tested at room temperature to determine their filter loss characteristics. The tests were carried out in a standard A.P.I. filter loss apparatus using standard filter paper. The results of these tests were as follows:

*Table II.—Comparison of dried fermentate and dried heteropolysaccharide*

| Sample | Apparent Viscosity, grams/sec., cm. | A.P.I. Filter Loss, milliliter/30 minutes |
|---|---|---|
| Solution containing dried fermentate | 3 | 31.5 |
| Solution containing dried heteropolysaccharide | 2.5 | 225 |

EXAMPLE III

In a further test, an additive agent prepared by fermenting a sugar solution with *Xanthomonas campestris* and drying the whole fermentate was used in a full scale drilling operation. The well in which the test was carried out was a development well located near a previous well in the same field on which complete records were available. The strata in the upper part of the test well were drilled with fresh water containing 6 percent drilled solids by volume. The dried fermentate was then added to this water in a concentration of ½ pound per barrel by means of a conventional mud gun. Paraformaldehyde was added in the same concentration to prevent fermentation. The mud system thus established required a total of 2400 pounds of additives, 1200 pounds of the dried fermentate and 1200 pounds of the paraformaldehyde. The conventional mud system used in the offset well required about 24,000 pounds of bentonite, soda ash, polyacrylic acid and other additives. The savings in transportation costs for the system using the dried fermentate over the conventional system were thus appreciable.

The fermentate fluid prepared as described above was used to drill a 2000 foot interval through moderately hard formation. Conventional oil field rotary drilling equipment and techniques were employed. The fluid was injected into the borehole, the bit was actuated in contact with the formation in the presence of the fluid, and fluid containing entrained cuttings produced by the bit was withdrawn to the surface. On circulating the fluid containing the fermentate, it was found that the pressure drop was about 10 percent less than it had been with the clear water at the same depth, indicating that the fermentate reduced friction losses in the drill string. This reduction in friction permits the delivery of more horsepower to the drill bit and increases the bit nozzle velocity which can be obtained with a given pump pressure at the surface. This in turn will normally permit higher drilling rates than can otherwise be obtained. With conventional muds, on the other hand, the pressure drop is normally higher than it is with clear water and hence nozzle velocities drop when fresh water is replaced by mud. Samples of the fluid containing the dried fermentate taken from the mud pit at regular intervals showed little change in properties as drilling progressed and hence little maintenance was required. A total of 2460 gallons of makeup water was used, compared with 3800 gallons in the offset well. The data showed that variations in mud weight and funnel viscosity were lower with fluid containing the fermentate than with conventional muds. Fluid loss properties showed little change. It was found that the fluid permitted high drilling rates and that the fermentate did not plate out on the cuttings. This latter point is significant in that it facilitates use of the cuttings to analyze the formations penetrated. No difficulties in recovering cuttings at the surface were experienced.

The bit record upon completion of the 4000 foot interval showed that bit life was about 20 percent better with the fluid containing the fermentate than with conventional muds used over the same interval in other wells in the field. Fewer trips into and out of the borehole to change bits were required and hence costs due to trips were lower. A caliper log ran to determine the extent to which the diameter of the borehole varied in the interval drilled with the fluid containing the dried fermentate showed marked improvement over wells drilled in the same field with other fluids. The permeable zones penetrated had a filter cake about $\frac{1}{32}$ of an inch thick, indicating excellent performance of the fermentate as a fluid loss agent under field conditions.

It is apparent from the results described above that xanthomonad fermentates are surprisingly effective additives for use in oil field drilling muds, completion fluids, workover fluids, fracturing fluids and similar compositions. The low concentrations required to prepare an effective drilling fluid, the absence of maintenance problems, the reduction in friction losses, the excellent fluid loss properties, the greater bit life, the substantial absence of fermentate on the cuttings, and the stability of the borehole wall are all significant and emphasize the unexpected effectiveness of the additives of the invention.

EXAMPLE IV

Oil-in-water emulsion muds containing dried xanthomonad fermentates were prepared with a variety of different emulsifying agents. Tests of these muds showed that a wide range of viscosities, gel strengths and other characteristics could readily be obtained by varying the concentrations in which the components were employed. The emulsions had excellent fluid loss properties and very good stability over long periods of time. The fermentates are thus useful as additives in a wide variety of different muds and similar compositions.

What is claimed is:

1. A method for reducing fluid losses to a porous subterranean formation surrounding a borehole in the earth which comprises incorporating a mixture of heteropolysaccharide and bacterial cells produced by the fermentation of an aqueous carbohydrate solution with bacteria of the genus Xanthomonas into an aqueous medium in a concentration between about 0.005 percent and about 3.0 percent by weight, injecting said medium into said borehole in contact with said porous formation, and thereafter withdrawing said medium from said borehole.

2. A method as defined by claim 1 wherein said mixture of heteropolysaccharide and bacterial cells is incorporated into said aqueous medium by adding a fermentate produced by the action of bacteria of the genus Xanthomonas on a carbohydrate solution to said medium.

3. A method as defined by claim 1 wherein said mixture of heteropolysaccharide and bacterial cells is recovered from a fermentate produced by the action of bacteria of the genus Xanthomonas on a carbohydrate solution and thereafter incorporated into said aqueous medium.

4. A method for reducing fluid losses from a borehole to a surrounding subterranean formation which comprises preparing an aqueous medium containing from about 0.005 to about 3.0 percent by weight of a dried mixture of heteropolysaccharide and bacterial cells prepared from a fermentate produced by the action of bacteria of the genus Xanthomonas on an aqueous carbohydrate solution, injecting said medium to said borehole in contact with said formation, and thereafter withdrawing said medium from said borehole.

5. A method as defined by claim 4 wherein said aqueous medium contains from about 0.05 to about 1.0 percent by weight of a dried mixture of heteropolysaccharide and bacterial cells prepared from a fermentate produced by the action of *Xanthomonas campestris* on an aqueous sugar solution.

6. A drilling method which comprises injecting an aqueous drilling fluid containing from about 0.005 to about 3.0 weight percent of a mixture of heteropolysaccharide and bacterial cells produced by the fermentation of an aqueous carbohydrate solution with bacteria of the genus Xanthomonas into a borehole in the earth, actuating a drill bit in contact with the formation at the bottom of said borehole in the presence of said drilling fluid, and withdrawing drilling fluid containing entrained cuttings produced by said bit from said borehole.

7. A method as defined by claim 6 wherein said mixture of heteropolysaccharide and bacterial cells is a mixture produced by the fermentation of an aqueous carbohydrate solution with *Xanthomonas campestris.*

8. A method as defined by claim 6 wherein said mixture of heteropolysaccharide and bacterial cells is a mixture produced by the fermentation of an aqueous carbohydrate solution with *Xanthomonas vesicatoria.*

9. A drilling method which comprises injecting an aqueous drilling fluid containing from about 0.005 to about 3.0 weight percent of a dried mixture of heteropolysaccharide and bacterial cells prepared from a fermentate produced by the action of bacteria of the genus Xanthomonas on an aqueous carbohydrate solution into a borehole in the earth, actuating a drill bit in contact with the formation at the bottom of said borehole in the presence of said drilling fluid, and withdrawing drilling fluid containing entrained cuttings produced by said bit from said borehole.

10. A method as defined by claim 9 wherein said drilling fluid is an oil-in-water emulsion.

11. A method as defined by claim 9 wherein said drilling fluid consists essentially of water, drilled solids, and said mixture of heteropolysaccharide and bacterial cells.

12. A drilling method which comprises injecting an aqeuous drilling fluid into a borehole in the earth, said fluid containing from about 0.005 to about 1.0 percent by weight of an additive prepared by fermenting an aqueous carbohydrate solution with bacteria of the genus Xanthomonas and recovering a dried mixture of heteropolysaccharide and bacterial cells from the resulting fermentate, actuating a drill bit in contact with the formation at the bottom of said borehole in the presence of said drilling fluid, and withdrawing drilling fluid containing cuttings produced by said bit from said borehole.

13. A method as defined by claim 12 wherein said additive is one prepared by fermenting a sugar solution with *Xanthomonas campestris* and drying the resultant fermentate.

14. A method as defined by claim 12 wherein said additive is one prepared by fermenting a sugar solution with *Xanthomonas pisi* and drying the resultant fermentate.

(References on following page)

References Cited by the Examiner

UNITED STATES PATENTS

| | | | |
|---|---|---|---|
| 3,000,790 | 9/61 | Jeanes et al. | 195—31 |
| 3,020,206 | 2/62 | Patton et al. | 195—31 |
| 3,020,207 | 2/62 | Patton et al. | 195—31 |

OTHER REFERENCES

Gatlin: "Petroleum Engineering Drilling and Well Completions," Prentice-Hall, Inc., Englewood Cliffs, N.J., 1960 (pp. 52–93 relied on).

BENJAMIN HERSH, *Primary Examiner.*